United States Patent
Pelleg et al.

(10) Patent No.: US 10,331,719 B2
(45) Date of Patent: Jun. 25, 2019

(54) TIP GENERATION

(71) Applicant: Oath Inc., New York, NY (US)

(72) Inventors: Dan Pelleg, Haifa (IL); Alexander Nus, Rishon LeZion (IL); Fiana Raiber, Karmeil (IL); Ido Guy, Haifa (IL); Avihai Mejer, Atlit (IL)

(73) Assignee: Oath Inc., New York, NY (US)

( * ) Notice: Subject to any disclaimer, the term of this patent is extended or adjusted under 35 U.S.C. 154(b) by 276 days.

(21) Appl. No.: 15/344,869

(22) Filed: Nov. 7, 2016

(65) Prior Publication Data
US 2018/0129732 A1 May 10, 2018

(51) Int. Cl.
| G06F 7/00 | (2006.01) |
| G06F 17/30 | (2006.01) |
| G06F 16/33 | (2019.01) |
| G06F 16/35 | (2019.01) |
| G06F 17/27 | (2006.01) |
| G06N 20/00 | (2019.01) |

(52) U.S. Cl.
CPC ........ *G06F 16/3344* (2019.01); *G06F 16/355* (2019.01); *G06F 17/277* (2013.01); *G06N 20/00* (2019.01)

(58) Field of Classification Search
CPC ... G06F 16/3344; G06F 16/355; G06F 17/277
See application file for complete search history.

(56) References Cited

U.S. PATENT DOCUMENTS

| 8,346,792 B1* | 1/2013 | Baker | G06F 16/254 |
| | | | 707/759 |
| 9,607,087 B1* | 3/2017 | Ofek | G06F 16/24578 |
| 2001/0047355 A1* | 11/2001 | Anwar | G06T 11/206 |
| 2003/0097355 A1* | 5/2003 | Kapitskaia | H04L 29/06 |
| 2004/0201604 A1* | 10/2004 | Kraenzel | G06Q 10/10 |
| | | | 715/700 |
| 2005/0114306 A1* | 5/2005 | Shu | G06F 16/9535 |

(Continued)

OTHER PUBLICATIONS

Weber, et al., "Answers, not Links: Extracting Tips from Yahoo! Answers to Address How-To Web Queries", InProceedings of the fifth ACM international conference on Web search and data mining (pp. 613-622). ACM, Feb. 8-12, 2012, pp. 1-10.

(Continued)

*Primary Examiner* — Hasanul Mobin
(74) *Attorney, Agent, or Firm* — Cooper Legal Group, LLC

(57) ABSTRACT

One or more computing devices, systems, and/or methods for generating a set of tips for an entity are provided. For example, users may create user generated content describing an entity, such as a user review for a consumer good, a location, an event, etc. Because a user may be unable to read and digest all of the user reviews for the entity, the user may merely read a few user reviews, and thus miss out on useful information. Accordingly, tip templates, indicative of how tips are linguistically/grammatically constructed, are applied to the user reviews to automatically extract a set of tips for the entity (e.g., "make sure to bring a rain jacket"). The set of tips may be filtered to remove undesirable tips, ranked based upon usefulness, and/or diversified to remove redundant tips. In this way, a set of useful tips may be provided to the user.

20 Claims, 8 Drawing Sheets

(56) References Cited

U.S. PATENT DOCUMENTS

| | | | | |
|---|---|---|---|---|
| 2005/0227218 | A1* | 10/2005 | Mehta | G09B 5/00 |
| | | | | 434/350 |
| 2005/0256727 | A1* | 11/2005 | Bennett | G06Q 30/0203 |
| | | | | 705/7.32 |
| 2005/0278164 | A1* | 12/2005 | Hudson | G06F 16/3344 |
| | | | | 704/4 |
| 2009/0019020 | A1* | 1/2009 | Dhillon | G06F 16/951 |
| 2009/0150388 | A1* | 6/2009 | Roseman | G06F 17/278 |
| 2012/0197926 | A1* | 8/2012 | Gill | G06Q 10/107 |
| | | | | 707/769 |
| 2013/0151514 | A1 | 6/2013 | Gionis et al. | |
| 2016/0147755 | A1* | 5/2016 | Goldberg | G06F 16/9535 |
| | | | | 707/723 |

OTHER PUBLICATIONS

Wicaksono, et al., "Mining Advices from Webblogs", https://pdfs.semanticscholar.org/5f37/c8c1a49ebd6adcbbee3aa24fbb486b7109b6.pdf, Oct. 29-Nov. 2, 2012, pp. 1-4.

Wicaksono, et al., "Toward Advice Mining: Conditional Random Fields for Extracting Advice-revealing Text Units", Oct. 27-Nov. 1, 2013, https://www.researchgate.net/publication/262410322_Toward_advice_mining_Conditional_random_fields_for_extracting_advice-revealing_text_units, pp. 2039-2048.

* cited by examiner

TIP GENERATION

BACKGROUND

Users may research various types of entities, such as locations when planning a trip, consumer goods when making a purchase, a company when buying stock, etc. A user may research an entity by accessing various websites through which users may have submitted user reviews or other user generated content such as blogs, forums, social network posts, etc. For example, the user may access an online shopping website to read reviews about a new blender. Each review may be composed of several sentences and/or paragraphs, and the online shopping website may comprise hundreds or even thousands of reviews for the new blender. Unfortunately, the user may become overwhelmed and merely read a few user reviews because there are too many user reviews for the user to read and digest. Thus, the user may miss out on a lot of useful information within user reviews that the user was unable to read. The online shopping website may allow the user to sort reviews by most recent or most popular. However, the user may still miss useful information within other reviews that are not sorted as the most recent or most popular.

SUMMARY

In accordance with the present disclosure, one or more computing devices and/or methods for generating a set of tips for an entity are provided. A set of ground truth tips associated with entities may be evaluated to identify patterns of n-grams (e.g., an occurrence of n words, such as a 4-gram "the best food is", a 5-gram "make sure not to do", a 6-gram "do not forget to bring a", etc. within a ground truth tip). For example, a travel website may provide a small set of travel tips (e.g., a travel tip comprising a single sentence used as a concise and well-defined suggestion for a point of interest), which may be used during a learning phase to learn how a tip sentence is constructed (e.g., grammatically/linguistically constructed). Accordingly, a set of candidate tip templates, indicative of how tips are linguistically constructed, may be constructed based upon the patterns of n-grams. A candidate tip template may comprise text of an n-gram "do not forget to bring" and/or one or more wildcards that can represent any text "do not forget to bring %wildcard%", which could be "do not forget to bring cash", "do not forget to bring water", etc. Wildcards may be used to add generality to a candidate tip template. A subset of the candidate tip templates may be selected from the set of candidate tip templates based upon a tip template repeat metric, corresponding to a number of times a candidate tip template repeats/occurs within the set of candidate tip templates, to create a set of tip templates. In this way, the set of tip templates may comprise frequently used n-grams within the ground truth tips. The set of tip templates may be filtered using a spam filter, an offensive content filer, and/or a classifier that is trained using a training set of labeled data that is labeled based upon whether tip templates are found to be useful or not useful for extracting tips from user generated content.

The set of tip templates may be applied to user generated content, such as a user review repository of user reviews for an entity, in order to extract a set of tips for the entity (e.g., a set of tips about a new blender may be extracted, using the set of tip templates, from user reviews about the new blender). It may be appreciated that the set of tip templates may be extracted from any type of user generated content, such as a blog, a social network post, a website, a forum, messages, emails, etc. For example, the set of tip templates may be applied to the set of user reviews for the new blender to extract a set of candidate tips, where a candidate tip comprises text of a user review that matches text of a tip template and/or satisfies any wildcards of the tip template (e.g., "make sure to use the power saving mode" of a user review may match a tip template "make sure to use the %wildcard% %wildcard% %wildcard%"). A classifier may be used to rank the set of candidate tips to create a ranked set of candidate tips based upon how useful or not useful such candidate tips are to users for the entity. For example, the classifier may rank the candidate tips based upon various features, such as a textual feature of the candidate tip (e.g., a number of characters or words of the candidate tip, a number of times the candidate tip was extracted/repeated, a location of the candidate tip within the user review, a language quality of the candidate tip such as a syntax, word choice, grammar, etc.), a tip template feature (e.g., a rank of the tip template regarding how useful the tip template is for producing useful tips), a user review feature (e.g., a number of characters or words of the user review, users' reactions to the user review, a reputation of a reviewer that wrote the user review, a position of the candidate tip within the user review, a language quality of the user review such as a syntax, word choice, grammar, etc.), etc.

The ranked set of candidate tips may be filtered based upon a tip usefulness filter (e.g., a spam filter may be applied to filter out spam, an offensiveness filter may be applied to filter out profanity, a classifier may predict that a candidate tip is below a usefulness threshold, etc.). A subset of the ranked set of candidate tips may be selected to create a set of tips (e.g., k number of highest ranked candidate tips, such as 5 candidate tips, may be selected). The set of tips may be filtered based upon a diversity criteria to create a diverse set of tips. For example, if a similarity between two tips exceeds a threshold (e.g., a threshold number of the same or similar words), then one of the tips may be filtered out of the set of tips and a next highest ranked candidate tip may be used to replace the filtered out tip. In this way, the set of tips may be provided to a user (e.g., "make sure to use the power saving mode", "don't forget to buy the extra set of mixer attachments", etc.). In an example, various action completion interfaces may be provided, such as a purchase functionality user interface used to purchase the new blender, the extra set of mixer attachments, etc.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
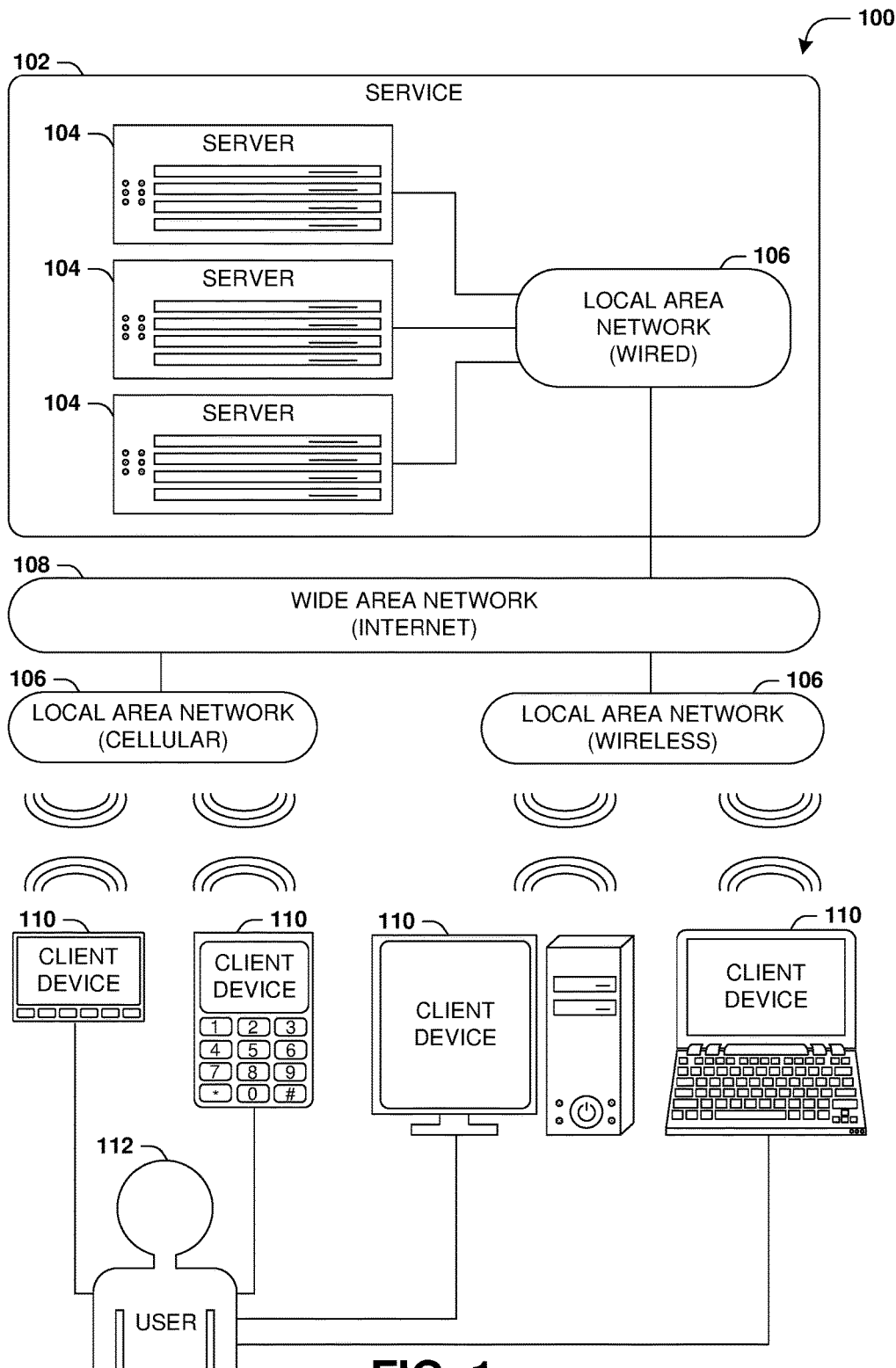
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
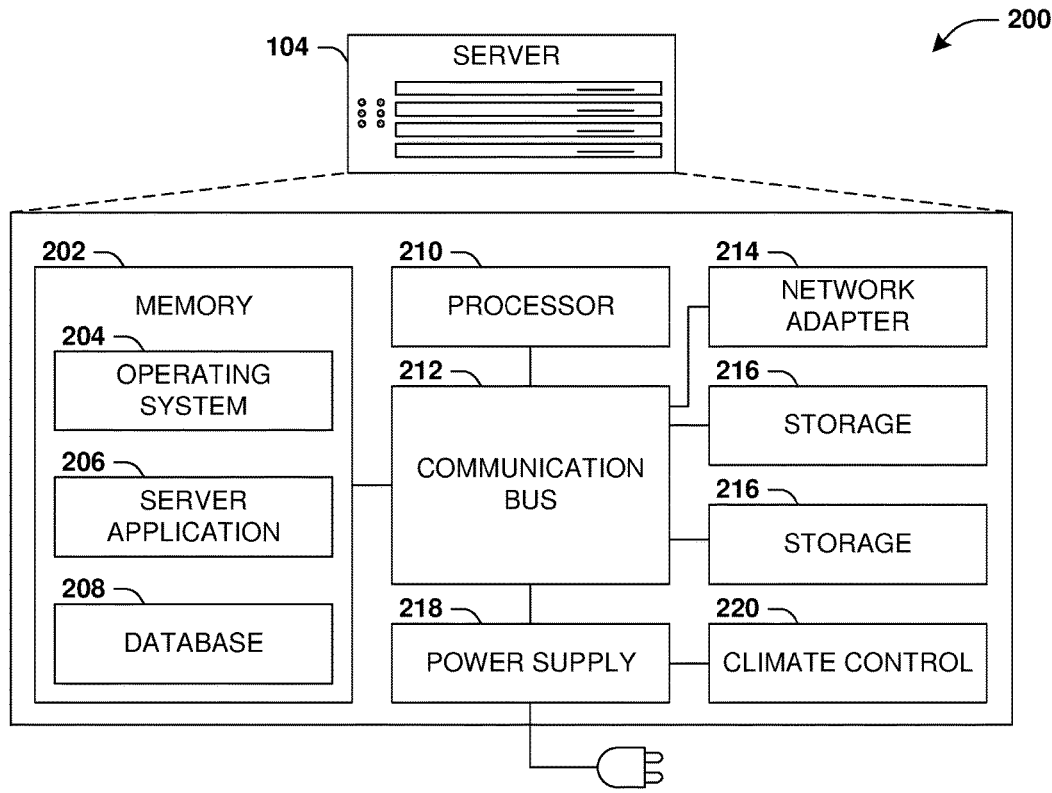
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
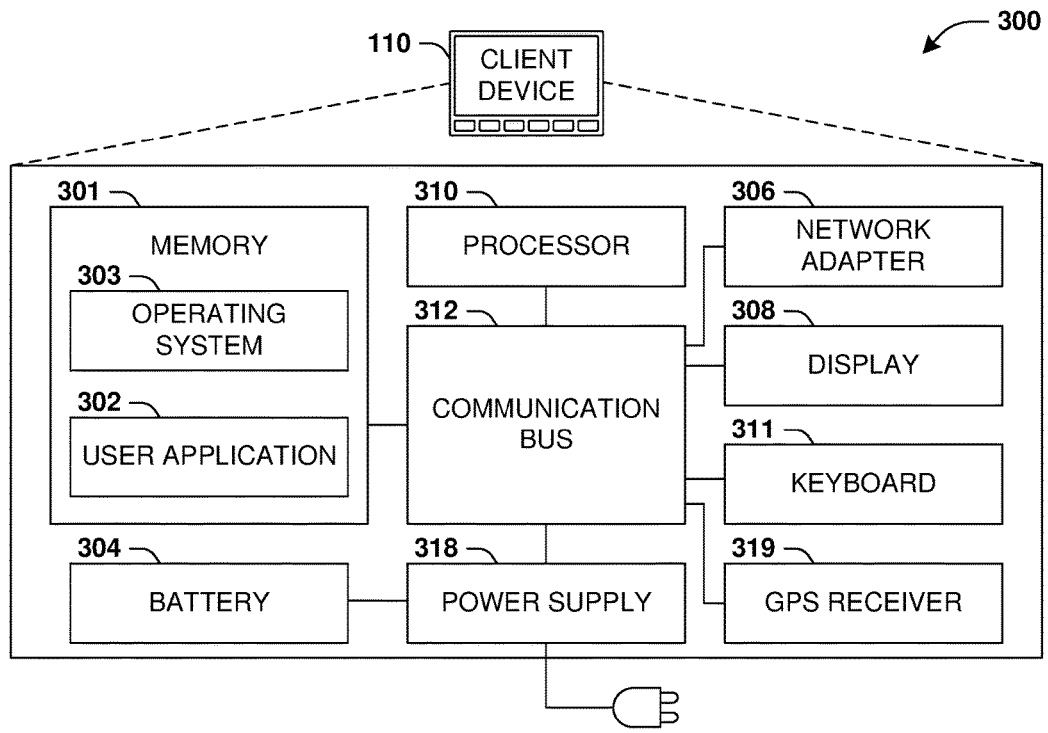
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating a set of tips are provided. For example, a user may have an interest in learning more about an entity, such as a consumer good, a location (e.g., things to do while in a particular city), an event, a business, an activity, an object, a person, etc. The user may access various websites that may provide user reviews or other user generated content about the entity. For example, the user may navigate to a shopping website to read user reviews about a new running watch. Users may write the user reviews to share opinions, insight, and knowledge about the new running watch. Some user reviews may comprise anywhere from a statement to a few paragraphs about the new running watch. Unfortunately, the shopping website may comprise hundreds or thousands of user reviews about the new running watch, which may overwhelm the user. Accordingly, the user may forego reading all of the user reviews, and may merely read a few user reviews, which may result in the user missing valuable and useful content in user reviews that the user is unable to read. For example, the user may merely read a few of the most recent or top user reviews. Otherwise, the user may waste considerable time and computing resources attempting to read all the user reviews in order to identify valuable and useful information about the new running watch.

Accordingly, as provided herein, tips about the entity may be automatically extracted from the user reviews and provided to the user, which may save valuable time and computing resources otherwise wasted by users attempting to read and digesting the hundreds or thousands of user reviews for the new running watch. For example, a set of ground truth tips (e.g., a set of known tips for an entity, such as a small set of travel tips for big cities from a travel website) may be used to identify a set of tip templates that are indicative of how tips are linguistically constructed (e.g., what words and phrases are frequently used in tips, such as "remember to bring . . . ", "don't go to the . . . ", "save money by . . . ", etc.). The set of tip templates may be applied to a user review repository for an entity to extract a set of tips for the entity. For example, a tip may be constructed as a single sentence from text of a user review that matches text of a tip template and/or any allowed wildcards. The set of tips may be ranked and/or filtered based upon usefulness, spam, offensiveness, etc. The set of tips may also be filtered based upon a diversity criteria so that the set of tips do not comprise redundant or duplicative tips. In this way, the set of tips (e.g., a top 5 ranked tips, where a tip is a well-defined, concise, and concrete sentence offering advice about the entity) may be provided to the user in order to quickly and concisely convey useful tips extracted from content of the user reviews so that the user does not have to waste substantial time and computing resources manually reading and digesting all the user reviews to identify such tips.

Figure 4:
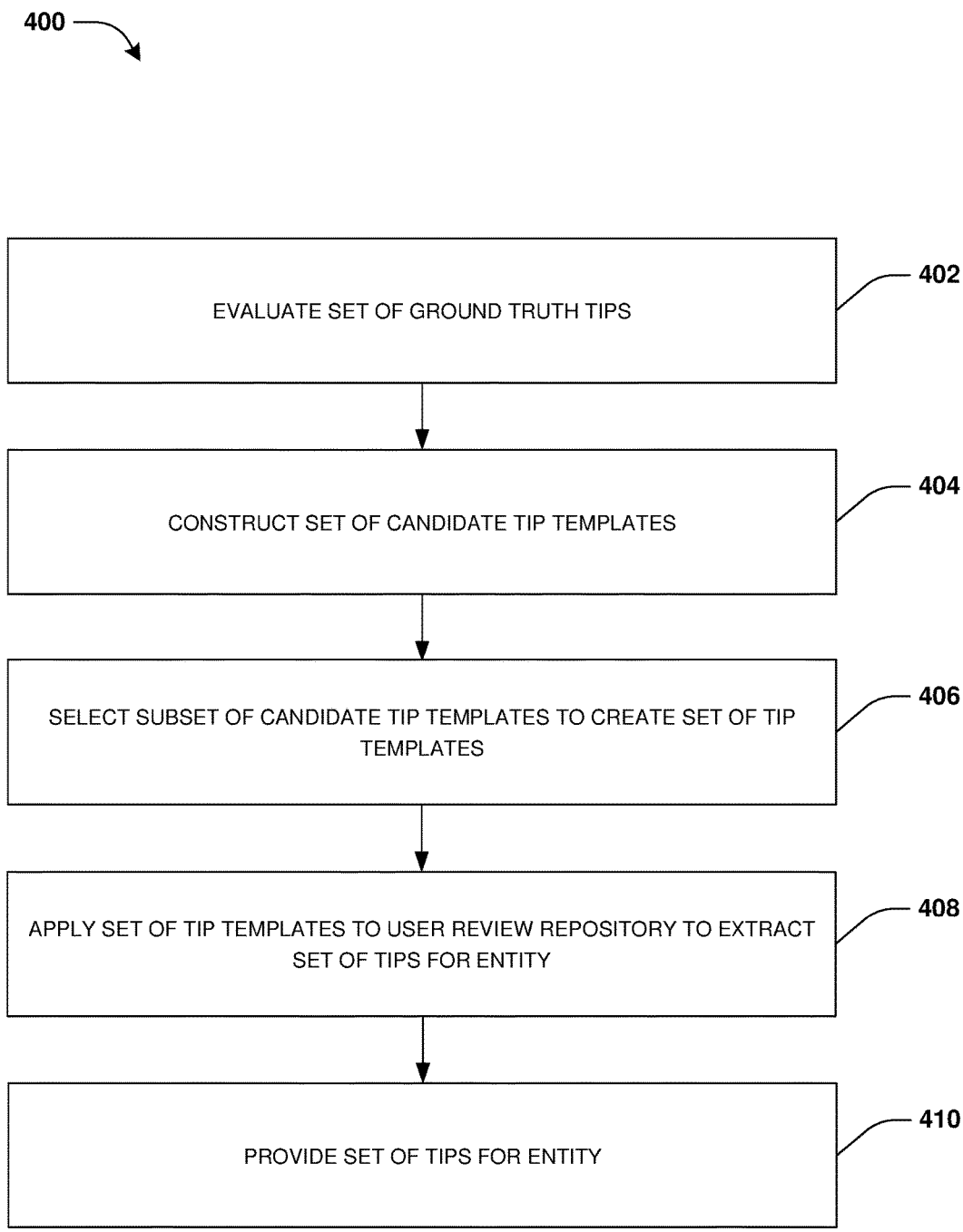
FIG. 4 is a flow chart illustrating an example method for generating a set of tip templates.

An embodiment of generating a set of tip templates is illustrated by an example method 400 of FIG. 4. The set of tip templates may be constructed during a learning phase, and used to extract from user generated content, such as user reviews, of an entity. During the learning phase, a set of ground truth tips associated with entities may be evaluated to identify patterns of n-grams, at 402. An n-gram may comprise a set of words extracted from text of a ground truth tip (e.g., a set of known tips, such as where a tip is a single sentence that provides useful advice for an entity), such as where a 4-gram comprises 4 words (e.g., "you will want to"), a 5-gram comprises 5 words (e.g., "make sure you do not"), etc. In an example, a candidate tip template may comprise one or more wildcards (e.g., "you will want to eat at %wildcard%"), where a wildcard may be any word/phrase/character. A number of allowed wildcards may be determined based upon features of the set of ground truth tips and/or of the entity (e.g., different amounts of generalization provided by wildcards may be appropriate for different sets of data).

At 404, a set of candidate tip templates, indicative of how tips are linguistically constructed (e.g., words and/or phrases used to construct a tip that is a single sentence providing concrete and well-defined advice about an entity), may be constructed based upon the patterns of n-grams. A candidate tip template may comprise text of an n-gram extracted from a ground truth tip and/or any wildcards. The set of candidate tip templates may be filtered based upon various filtering criteria. In an example, a spam filter may be used to remove candidate tip templates that appear to be spam. In another example, an offensive content filter may be used to remove candidate tip templates that comprise offensive language or content. In another example, a classifier, trained using a training set of labeled data this is labeled based upon whether tip templates are found to be useful or not useful (e.g., whether a tip template extracts useful tips or not from user reviews or other text), may be used to filter the set of candidate tip templates by removing candidate tip templates having features indicative of not useful tip templates.

At 406, a subset of candidate tip templates may be selected from the set of candidate tip templates based upon a tip template repeat metric to create a set of tip templates. The tip template repeat metric may correspond to a number of times a candidate tip template repeats within the set of candidate tip templates. For example, the tip template repeat metric may correspond to a threshold number of repeating n-grams within the set of ground truth tips. In this way, tip templates that occur more frequently within the set of tip templates may be selected, while other less frequently occurring tip templates may not be selected. For example, a tip template corresponding to an n-gram "you will definitely want to" proceeded by one or more wildcards may occur more frequently within the set of ground truth tips than an n-gram "who really understands" within the set of candidate tip templates.

At 408, the set of tip templates may be applied to a user review repository for an entity to extract a set of tips for the entity. The set of tip templates define words and/or phrases used to construct useful tips, and thus may be used to extract text from user reviews that are indicative of useful tips. In an example, the set of tip templates may be applied to user reviews of the entity (e.g., user reviews about a television) to identify a set of candidate tips. A candidate tip may comprise text of a user review that matches text of a tip template and/or satisfies any wildcards for the tip template (e.g., text of a user review "you will definitely want to swim" may match a tip template "you will definitely want to %wildcard%").

A classifier may be used to rank the set of candidate tips to create a ranked set of candidate tips based upon various features. The candidate tips are ranked based upon usefulness of such candidate tips to a user for the entity. The classifier may rank candidate tips based upon a textual feature of the candidate tip (e.g., a number of characters or words of the candidate tip, a number of times the candidate tip was extracted/repeated, a location of the candidate tip within the user review, a language quality of the candidate tip such as a syntax, word choice, grammar, etc.). The classifier may rank candidate tips based upon a tip template feature (e.g., a rank of the tip template regarding how useful the tip template is for producing useful tips). The classifier may rank candidate tips based upon a user review feature (e.g., a number of characters or words of the user review, users' reactions to the user review, a reputation of a reviewer that wrote the user review, a position of the candidate tip within the user review, a language quality of the user review such as a syntax, word choice, grammar, etc.).

In an example, the ranked set of candidate tips may be filtered based upon a spam filter that filters ranked candidate tips that are indicative of spam. In another example, the ranked set of candidate tips may be filtered based upon an offensive content filter that may remove ranked candidate tips with offensive language or offensive content. A subset of the ranked set of candidate tips may be selected to define the set of tips. For example, a top 5 ranked candidate tips may be selected as the set of tips. In an example, the set of tips may be filtered based upon a diversity criteria that removes tips that are similar above a threshold (e.g., tips with a threshold number of similar words or phrases or having similar topics). Responsive to the diversity criteria removing a tip from the set of tips, the tip may be replaced with a next ranked candidate tip from the ranked set of candidate tips that satisfies the diversity criteria (e.g., a tip that is not similar to the remaining tips within the set of tips).

At 410, the set of tips for the entity may be provided to a user. In an example, the set of tips may be displayed through a website, such as a website that provides the user reviews for the television. In another example, the set of tips may be emailed or messaged to the user. In another example, the set of tips may be provided as a recommendation, a push notification, or through a personal assistant. In this way, the set of tips may be provided through any type of user interface.

Figure 5:
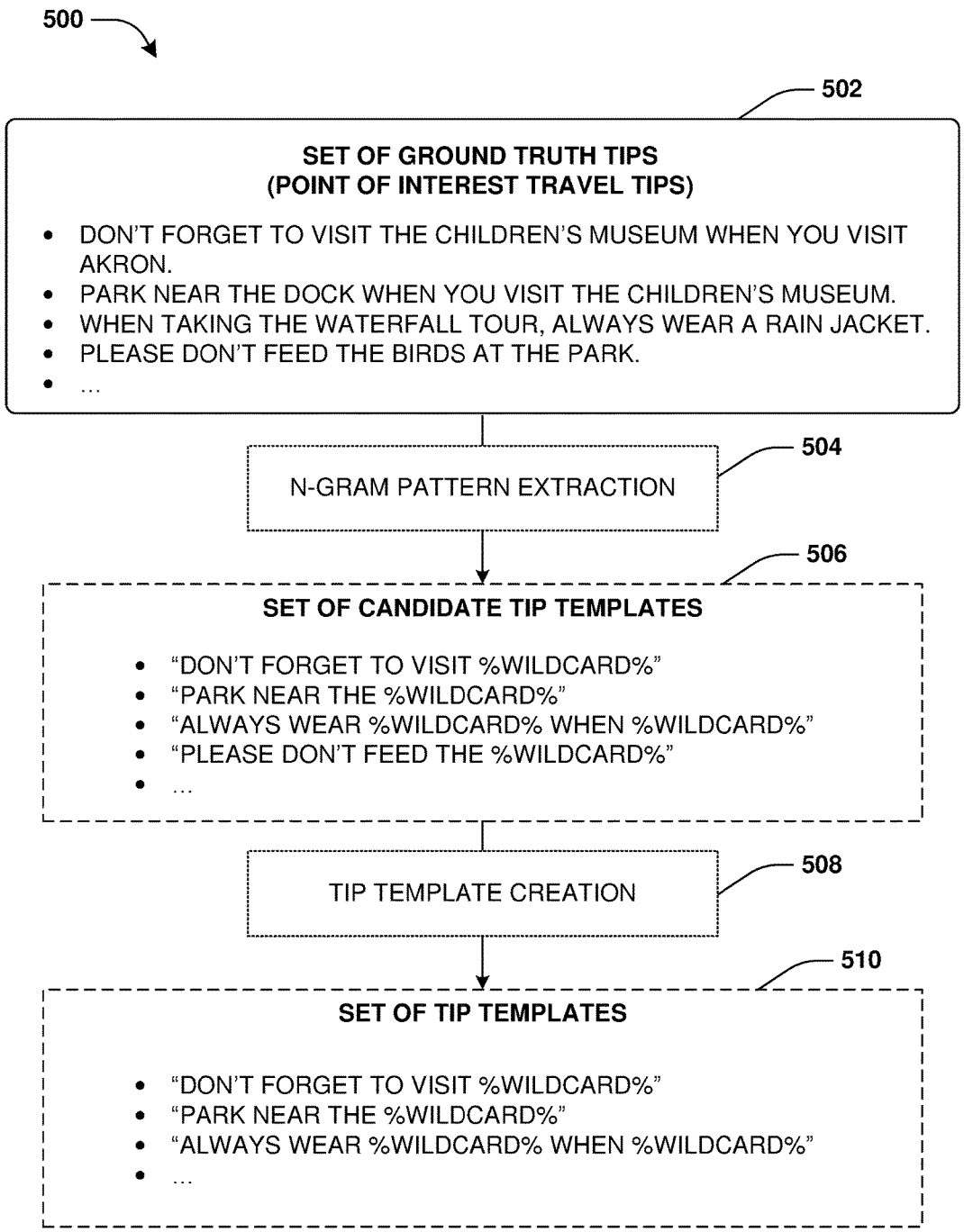
FIG. 5 is a component block diagram illustrating an example system for generating a set of tip templates.

FIG. 5 illustrates an example of a system 500 for generating a set of tip templates 510 used to extract tips from user generated text (e.g., user reviews, social network posts, blogs, forums, emails, etc.). A set of ground truth tips 502 may comprise sentences that are known to be tips. For example, a travel website may provide point of interest travel tips, such as a first tip "don't forget to visit the children's museum when you visit Akron", a second tip "park near the dock when you visit the children's museum", a third tip "when taking the waterfall tour, always wear a rain jacket", a fourth tip "please don't feed the birds at the park", and/or other tips associated with entities, such as museums, parks, cities, and/or other locations. The set of ground truth tips 502 may be evaluated using n-gram pattern extraction 504 to identify patterns of n-grams occurring within the tips. For example, an n-gram may comprise n words within a ground truth tip, such as a 4-gram (e.g., "don't forget to visit", "park near the dock", "when taking the waterfall", etc.), 5-grams (e.g., "visit the children's museum when", "don't feed the birds at", etc.), 6-grams (e.g., "the dock when you visit the", "when taking the waterfall tour, always", etc.), etc.

A set of candidate tip templates 506 may be constructed from the patterns of n-grams. A candidate tip template may be indicative of how tips are linguistically constructed, such as what words, grammar, phrases, word order, etc. are used to construct tips. The candidate tip template may comprise words from an n-gram. In an example, the candidate tip template may comprise one or more wildcards that can represent any word, phrase, or character, which adds generality for the candidate tip template. For example, the set of candidate tip templates 506 may comprise a first candidate tip template "don't forget to visit %wildcard%", a second candidate tip template "park near the %wildcard%", a third candidate tip template "always wear %wildcard% when %wildcard%", a fourth candidate tip template "please don't feed the %wildcard%", etc.

Because merely some of the candidate tip templates may be useful for extracting tips from user generated content, a subset of candidate tip templates may be selected from the set of candidate tip templates 506 for tip template creation 508 to create a set of tip templates 510. For example, frequently occurring/repeating candidate tip templates within the set of candidate tip templates 506 may be selected for inclusion within the set of tip templates 510 based upon a tip template repeat metric corresponding to a number of times a candidate tip template repeats within the set of candidate tip templates. For example, the first candidate tip template "don't forget to visit %wildcard%", the second candidate tip template "park near the %wildcard%", and the third candidate tip template "always wear %wildcard% when %wildcard%" may repeat more frequently than the fourth candidate tip template "please don't feed the %wildcard%", and thus may be included within the set of tip templates 510. In an example, the set of tip templates 510 may be filtered using a classifier trained using a training set of labeled data that is labeled based upon whether tip templates are found to be useful or not useful for extracting useful tips from user generated content. In this way, the set of tip templates 510 may be used to extract tips from user generated content.

Figure 6:
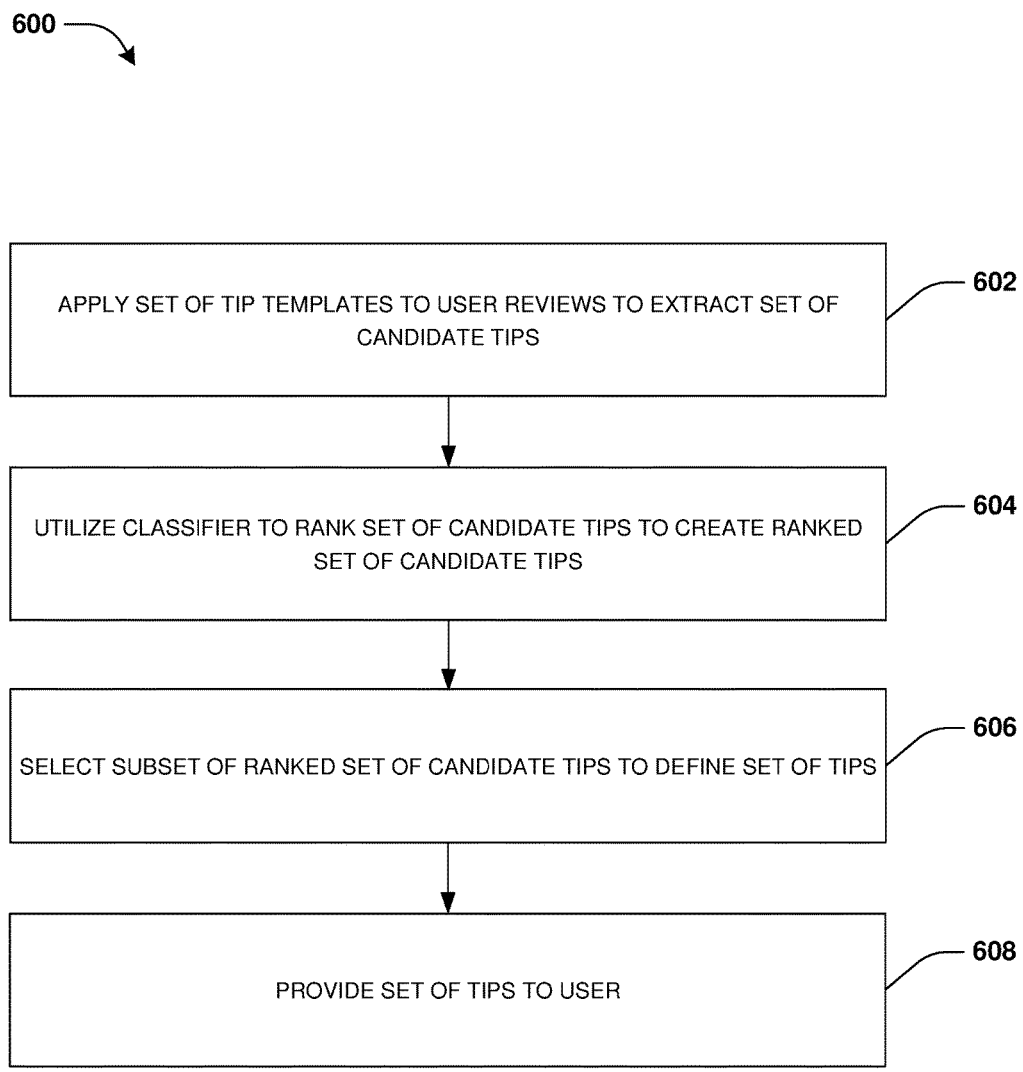
FIG. 6 is a flow chart illustrating an example method for generating a set of tips.

An embodiment of generating a set of tips is illustrated by an example method 600 of FIG. 6. At 602, a set of tip templates may be applied to a set of user reviews of an entity to extract a set of candidate tips. It may be appreciated that the set of tip templates can be applied to any type of user generated content, such as blogs, social network posts, forums, etc. A candidate tip may be extracted from text of a user review that matches text of a tip template and/or any wildcards of the tip template (e.g., text "park near the flagpole" of a user review for an aquarium may match and satisfy a tip template "park near the %wildcard%").

At 604, a classifier may be used to rank the set of candidate tips to create a ranked set of candidate tips based upon a feature. For example, the classifier may rank the candidate tips based upon a textual feature of the candidate tip (e.g., a number of characters or words of the candidate tip, a number of times the candidate tip was extracted/repeated, a location of the candidate tip within the user review, a language quality of the candidate tip such as a syntax, word choice, grammar, etc.). The classifier may rank the candidate tips based upon a tip template feature (e.g., a rank of the tip template regarding how useful the tip template is for producing useful tips). The classifier may rank the candidate tips based upon a user review feature (e.g., a number of characters or words of the user review, users' reactions to the user review, a reputation of a reviewer that wrote the user review, a position of the candidate tip within the user review, a language quality of the user review such as a syntax, word choice, grammar, etc.). In this way, a candidate tip may be ranked based upon a usefulness of the candidate tip to a user for the entity. In an example, the ranked set of candidate tips may be filtered using a tip usefulness filter that removes offensive tips, spam tips, and/or other not useful tips.

At 606, a subset of the ranked set of candidate tips may be selected to define a set of tips. For example, a top 5 ranked candidate tips may be selected to define the set of tips. In an example, the set of tips may be filtered based upon a diversity criteria in order to remove and replace candidate tips that are too similar. Similarity between two candidate tips may be determined based upon a number of similar words or phrases, a similarity between topics of the two candidate tips, etc. If the diversity criteria removes a tip, then a next highest ranked candidate tip may be used to replace the removed tip.

At 608, the set of tips may be provided to a user. In an example, the set of tips may be provided through a website that provides information about the entity. In another example, the set of tips may be provided as a recommendation (e.g., push notifications), through email, etc. Various action completion interfaces may be provided with the set of tips, such as an event reservation functionality user interface used to make a reservation for an event, reserve a table at a restaurant, purchase tickets for the event, etc. For a location entity, a travel reservation functionality user interface may be provided so that the user could reserve an air flight, book a hotel, rent a car, etc. For a consumer good entity, a purchase functionality user interface may be provided. In this way, various action completion interactions may be provided with the set of tips.

Figure 7:
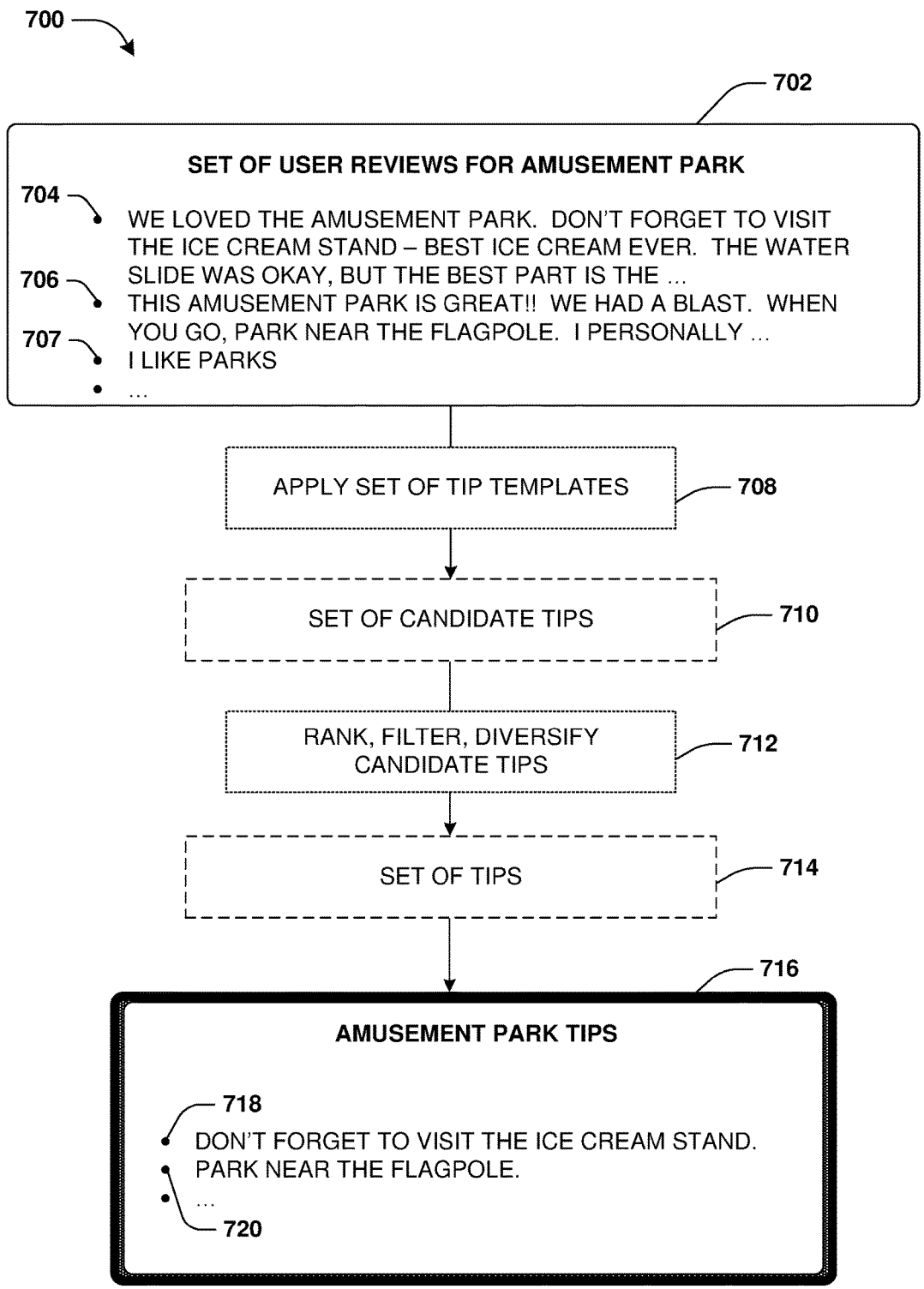
FIG. 7 is a component block diagram illustrating an example system for generating a set of tips for an amusement park entity.

FIG. 7 illustrates an example of a system 700 for generating a set of tips for an entity. For example, a summer activities website may provide information about various summer activity locations within a state, such as an amusement park entity. Users may be able to write reviews about such summer activity locations. For example, the summer activities website may comprise a set of user reviews 702 for the amusement park entity, such as a first user review 704 "We loved the amusement park. Don't forget to visit the ice cream stand—best ice cream ever. The water slide was okay, but the best part is the . . . ", a second user review 706 "This amusement park is great!! We had a blast. When you go, park near the flag pole. I personally . . . ", a third user review 707 "I like parks", and/or other user reviews. Because there may be hundreds or thousands of user reviews for the amusement park entity, a user may be unable to read and digest all the information within the user reviews, and thus may merely read a few user reviews and miss out on a lot of useful information. Accordingly, a set of tips 714 for the amusement park entity may be automatically extracted from the set of user reviews 702 for the amusement park entity.

A set of tip templates 708 may comprise tip templates with text and/or wildcards used to identify text within the user reviews that match such tip templates. The set of tip templates 708 may be applied to the set of user reviews 702 to extract a set of candidate tips 710. For example, a tip template "don't forget to visit the %wildcard% %wildcard% %wildcard%" may be used to extract a first candidate tip 718 "don't forget to visit the ice cream stand" from the first user review 704. A tip template "park near the %wildcard%" may be used to extract a candidate tip 720 "park near the flagpole" from the second user review 706. In this way, a candidate tip may be extracted from a user review having text that matches text of a tip template and/or any wildcards of the tip template.

The set of candidate tips 710 may be processed 712, such as ranked, filtered, diversified, etc. In an example, a classifier may be used to rank the set of candidate tips to create a ranked set of candidate tips based upon a textual feature of a candidate tip, a tip template feature of a tip template that was used to extract the candidate tip, a user review feature of a user review from which the candidate tip was extracted, etc. For example, the classifier can rank candidate tips based upon their usefulness to a user for the amusement park entity (e.g., a candidate tip may be more useful if it occurs more often within the set of user reviews 702, has correct grammar and syntax, uses certain keywords or phrases, was written by a reviewer that has a high reputation, etc.). The ranked set of candidate tips may be filtered using a spam filter, an offensive content filter, etc. In this way, a set of tips 714 may be selected from the ranked set of candidate tips (e.g., a top 4 ranked candidate tips). The set of tips 714 may be diversified by removing redundant tips, and replacing removed tips with diverse tips. The set of tips 714 may be provided to a user, such as through an amusement park tips interface 716.

Figure 8:
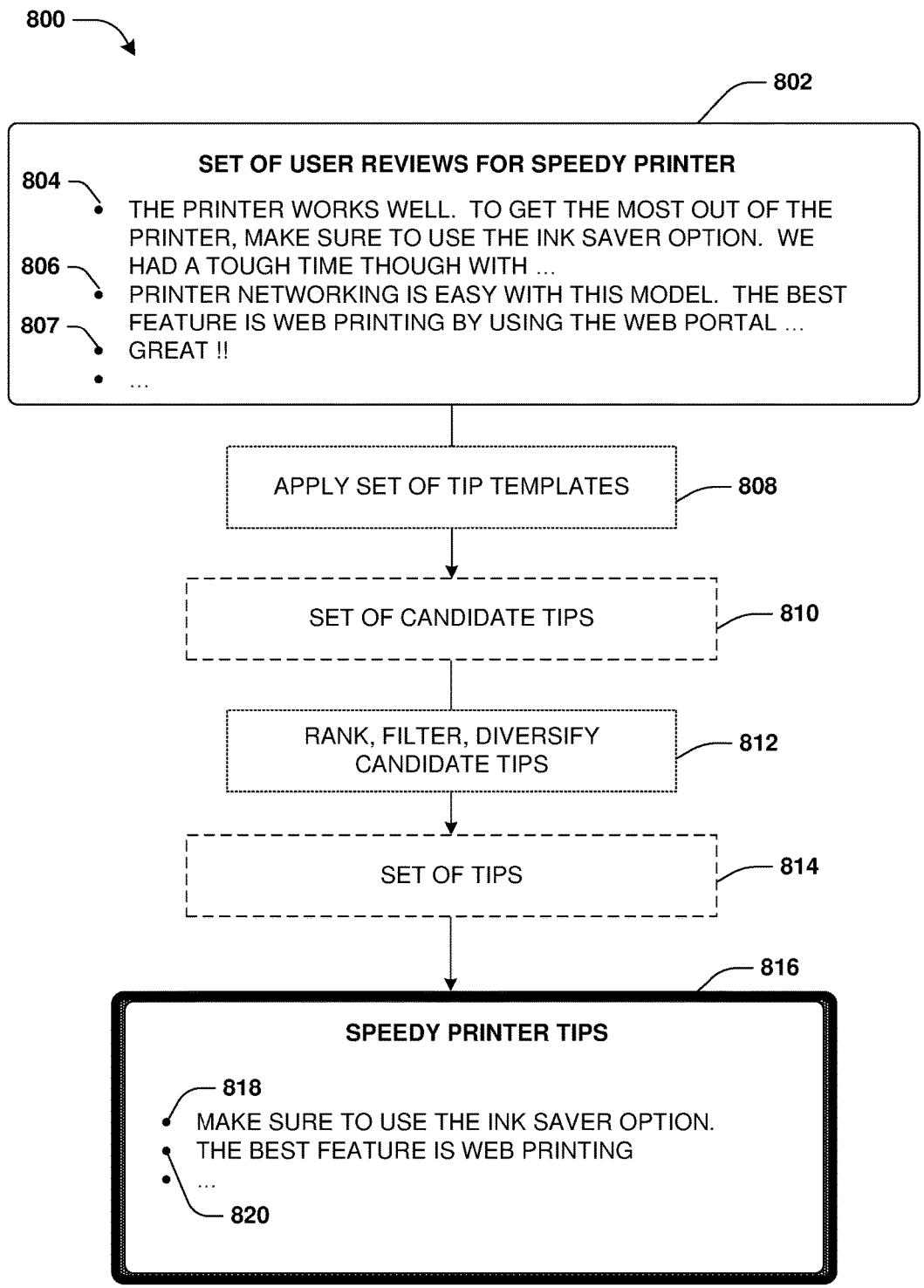
FIG. 8 is a component block diagram illustrating an example system for generating a set of tips for a speedy printer entity.

FIG. 8 illustrates an example of a system 800 for generating a set of tips for an entity. For example, a shopping website may provide information about various consumer goods, such as speedy printer entity. Users may be able to write reviews about such consumer goods. For example, the shopping website may comprise a set of user reviews 802 for the speedy printer entity, such as a first user review 804 "The printer works well. To get the most out of the printer, make sure to use the ink saver option. We had a tough time though with . . . ", a second user review 806 "Printer networking is easy with this model. The best feature is web printing by using the web portal . . . ", a third user review 807 "Great !!", and/or other user reviews. Because there may be hundreds or thousands of user reviews for the speedy printer entity, a user may be unable to read and digest all the information within the user reviews, and thus may merely read a few user reviews and miss out on a lot of useful information. Accordingly, a set of tips 814 for the speedy printer entity may be automatically extracted from the set of user reviews 802 for the speedy printer entity.

A set of tip templates 808 may comprise tip templates with text and/or wildcards used to identify text within the user reviews that match such tip templates. The set of tip templates 808 may be applied to the set of user reviews 802 to extract a set of candidate tips 810. For example, a tip template "make sure to use the %wildcard% %wildcard% %wildcard%" may be used to extract a first candidate tip 818 "make sure to use the ink saver option" from the first user review 804. A tip template "the best feature is %wildcard% %wildcard%" may be used to extract a candidate tip 820 "the best feature is web printing" from the second user review 806. In this way, a candidate tip may be extracted from a user review having text that matches text of a tip template and/or any wildcards of the tip template.

The set of candidate tips 810 may be processed 812, such as ranked, filtered, diversified, etc. In an example, a classifier may be used to rank the set of candidate tips to create a ranked set of candidate tips based upon a textual feature of a candidate tip, a tip template feature of a tip template that was used to extract the candidate tip, a user review feature of a user review from which the candidate tip was extracted, etc. For example, the classifier can rank candidate tips based upon their usefulness to a user for the speedy printer entity (e.g., a candidate tip may be more useful if it occurs more often within the set of user reviews 802, has correct grammar and syntax, uses keywords or phrases, was written by a reviewer that has a high reputation, etc.). The ranked set of candidate tips may be filtered using a spam filter, an offensive content filter, etc. In this way, a set of tips 814 may be selected from the ranked set of candidate tips (e.g., a top 3 ranked candidate tips). The set of tips 814 may be diversified by removing redundant tips, and replacing removed tips with diverse tips. The set of tips 814 may be provided to a user, such as through a seedy printer tips interface 816.

Figure 9:
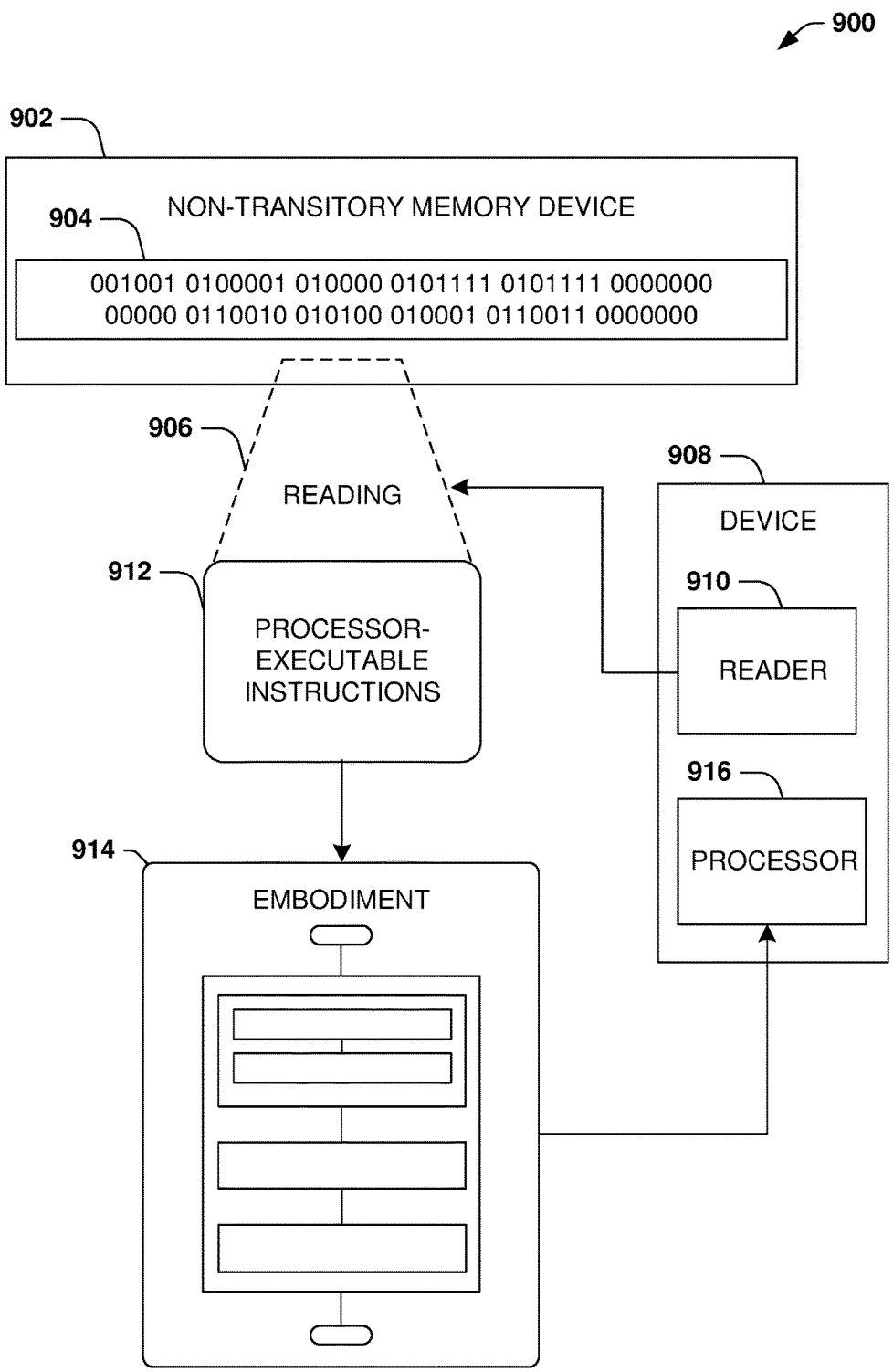
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4 and/or at least some of the example method 600 of FIG. 6, for example. In some embodiments, the processor-executable instructions 912 are configured to cause implementation of a system, such as at least some of the example system 500 of FIG. 5, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of generating a set of tips, the method involving a computing device comprising a processor, and the method comprising:

executing, on the processor, instructions that cause the computing device to perform operations, the operations comprising:

evaluating a set of ground truth tips associated with entities to identify patterns of n-grams;

constructing a set of candidate tip templates, indicative of how tips are linguistically constructed, based upon the patterns of n-grams;

selecting a subset of candidate tip templates from the set of candidate tip templates based upon a tip template repeat metric, corresponding to a number of times at least one candidate tip template repeats within the set of candidate tip templates, to create a set of tip templates, wherein a candidate tip template of the set of tip templates comprises a wildcard;
applying the set of tip templates to a set of user reviews for an entity to extract a set of candidate tips for the entity, wherein a candidate tip of the set of candidate tips comprises text of a user review that matches text of the candidate tip template and satisfies the wildcard of the candidate tip template;
utilizing a classifier to rank the set of candidate tips to create a ranked set of candidate tips based upon a feature, the candidate tip ranked based upon a usefulness of the candidate tip to a user for the entity;
determining a set of tips for the entity based upon the ranked set of candidate tips; and
providing the set of tips to one or more users.

2. The method of claim 1, wherein the tip template repeat metric corresponds to a threshold number of repeating n-grams within the set of ground truth tips.

3. The method of claim 1, wherein the entity comprises at least one of a location entity, an event entity or a consumer good.

4. The method of claim 1, comprising:
determining a number of wildcards for the candidate tip template based upon a feature of the set of ground truth tips.

5. The method of claim 1, comprising:
determining a number of wildcards for the candidate tip template based upon a feature of the entity.

6. The method of claim 1, comprising:
filtering the set of candidate tip templates using a spam filter.

7. The method of claim 1, comprising:
filtering the set of candidate tip templates using an offensive content filter.

8. The method of claim 1, comprising:
filtering the set of candidate tip templates using a classifier trained using a training set of labeled data that is labeled based upon whether tip templates are found to be useful or not useful for extracting tips from user generated content.

9. The method of claim 1, wherein a tip of the set of tips is constrained to a single sentence.

10. The method of claim 1, wherein the determining the set of tips comprises:
selecting a subset of the ranked set of candidate tips to define the set of tips.

11. The method of claim 1, comprising:
filtering the ranked set of candidate tips using an offensive content filter and a spam filter.

12. The method of claim 1, comprising:
filtering the set of tips based upon a diversity criteria; and
responsive to the diversity criteria removing a tip from the set of tips, replacing the tip with a next candidate tip from the ranked set of candidate tips that satisfies the diversity criteria.

13. A computing device comprising:
a processor; and
memory comprising processor-executable instructions that when executed by the processor cause performance of operations, the operations comprising:
evaluating a set of ground truth tips associated with entities to identify patterns of n-grams;
constructing a set of candidate tip templates, indicative of how tips are linguistically constructed, based upon the patterns of n-grams;
selecting a subset of candidate tip templates from the set of candidate tip templates based upon a tip template repeat metric, corresponding to a number of times at least one candidate tip template repeats within the set of candidate tip templates, to create a set of tip templates, wherein a candidate tip template of the set of tip templates comprises a wildcard;
applying the set of tip templates to a set of user reviews for an entity to extract a set of candidate tips for the entity, wherein a candidate tip of the set of candidate tips comprises text of a user review that matches text of the candidate tip template and satisfies the wildcard of the candidate tip template;
utilizing a classifier to rank the set of candidate tips to create a ranked set of candidate tips based upon a feature, the candidate tip ranked based upon a usefulness of the candidate tip to a user for the entity;
determining a set of tips for the entity based upon the ranked set of candidate tips; and
providing the set of tips to one or more users.

14. The computing device of claim 13, wherein the operations comprise:
responsive to a tip of the set of tips corresponding to an event entity, providing an event reservation functionality user interface.

15. The computing device of claim 13, wherein the operations comprise:
responsive to a tip of the set of tips corresponding to a location entity, providing a travel reservation functionality user interface.

16. The computing device of claim 13, wherein the operations comprise:
responsive to a tip of the set of tips corresponding to a consumer good, providing a purchase functionality user interface.

17. The computing device of claim 13, wherein the operations comprise:
filtering the ranked set of candidate tips using at least one of an offensive content filter or a spam filter.

18. The computing device of claim 13, wherein the operations comprise:
filtering the set of tips based upon a diversity criteria.

19. A non-transitory machine readable medium having stored thereon processor-executable instructions that when executed cause performance of operations, the operations comprising:
evaluating a set of ground truth tips associated with entities to identify patterns of n-grams;
constructing a set of candidate tip templates, indicative of how tips are linguistically constructed, based upon the patterns of n-grams;
selecting a subset of candidate tip templates from the set of candidate tip templates based upon a tip template repeat metric, corresponding to a number of times at least one candidate tip template repeats within the set of candidate tip templates, to create a set of tip templates, wherein a candidate tip template of the set of tip templates comprises a wildcard;
applying the set of tip templates to a set of user reviews for an entity to extract a set of candidate tips for the entity, wherein a candidate tip of the set of candidate tips comprises text of a user review that matches text of the candidate tip template and satisfies the wildcard of the candidate tip template;
utilizing a classifier to rank the set of candidate tips to create a ranked set of candidate tips based upon a feature, the candidate tip ranked based upon a usefulness of the candidate tip to a user for the entity;

determining a set of tips for the entity based upon the ranked set of candidate tips; and providing the set of tips to one or more users.

20. The non-transitory machine readable medium of claim 19, wherein the operations comprise:

filtering the set of tips based upon a diversity criteria to create a diverse set of tips; and providing the diverse set of tips to the one or more users.

* * * * *